United States Patent [19]
Daudel et al.

[11] Patent Number: 6,050,093
[45] Date of Patent: Apr. 18, 2000

[54] METHOD OF CONTROLLING A SUPERCHARGED INTERNAL COMBUSTION ENGINE AND APPARATUS FOR PERFORMING THE METHOD

[75] Inventors: Helmut Daudel, Schorndorf; Siegfried Sumser, Stuttgart, both of Germany

[73] Assignee: DaimlerChrylser AG, Stuttgart, Germany

[21] Appl. No.: 09/074,101

[22] Filed: May 7, 1998

[30] Foreign Application Priority Data

May 9, 1997 [DE] Germany .................. 197 19 630

[51] Int. Cl.[7] .................................................. F02D 23/00
[52] U.S. Cl. ........................................................... 60/602
[58] Field of Search ....................................... 60/600, 602

[56] References Cited

U.S. PATENT DOCUMENTS 4,779,423  10/1988  Szczupak .
4,891,947  1/1990   Kishi et al. .
4,970,864  11/1990  Kazuo et al. .

FOREIGN PATENT DOCUMENTS 40 14 398  11/1991  Germany .
40 25 901  1/1992   Germany .

Primary Examiner—Noah P. Kamen
Attorney, Agent, or Firm—Klaus J. Bach

[57] ABSTRACT

In a method and apparatus for controlling a supercharged internal combustion engine including an exhaust gas turbocharger having variable turbine inlet vanes, an engine control unit includes an engine performance graph with control parameters for a multitude of engine operating points compressor performance graph is also recorded in the engine performance which represents for various exhaust gas turbocharger speeds a particular relationship between mass flow through the compressor and total pressure ratio. A multitude of engine operating curves for constant turbine guide vane positions and constant engine speeds for various engine loads and engine operating modes are also recorded and retrieved by the engine control unit for controlling the engine depending on desired engine load and engine speed for adjusting the turbine inlet vanes.

12 Claims, 6 Drawing Sheets

6,050,093

METHOD OF CONTROLLING A SUPERCHARGED INTERNAL COMBUSTION ENGINE AND APPARATUS FOR PERFORMING THE METHOD

BACKGROUND OF THE INVENTION

The invention relates to a method of controlling a supercharged internal combustion engine having a turbocharger with variable turbine geometry. The engine has a performance graph including a plurality of engine operating points with the corresponding control parameters stored therein for supply to an engine controller and, in addition, turbine control parameters for the turbine.

DE 40 14 398 discloses a control for a turbocharged internal combustion engine whose exhaust gas turbocharger includes an exhaust gas turbine with variable turbine geometry and a charge air compressor. The engine includes a control unit with a load-speed performance graph stored therein, wherein the performance graph is delimited at the top by a full load line and at the bottom by a line for engine driven operation. In order to insure a fast warm-up of a catalytic converter after engine startup, the control unit causes the variable turbine guide vanes to be set to a predetermined position depending on input signals for the coolant temperature, exhaust gas temperature, throttle valve position and engine speed such that the flow cross-section of the exhaust gas duct is reduced during a cold start.

DE 40 25 901 C1 further discloses a method of controlling the charge pressure of an internal combustion engine including an exhaust gas turbocharger with adjustable turbine vanes to a desired charge air pressure depending on engine operating conditions. In this case, the flow cross-section of the turbine guide vanes is reduced and the charge air pressure is controlled first in accordance with a first characteristic line and, after passing a certain threshold value for the exhaust gas pressure in accordance with the first characteristic line. After passing a certain threshold value for the exhaust gas pressure, the charge air pressure is controlled in accordance with a second characteristic line in order to improve the efficiency of the engine during in stationary operation, especially after a positive load change from a low engine load and engine speed.

For general technical background, reference is further made to U.S. Pat. Nos. 4,970,864; 4,779,423 and 4,891,947.

It is the object of the present invention to provide a method of controlling a supercharged internal combustion engine with an exhaust gas turbocharger having a variable turbine geometry. It is also an object of the invention to provide an apparatus for performing the method, wherein the engine control for various engine loads and engine operating states is substantially more variable than is possible with methods and apparatus known in the art.

SUMMARY OF THE INVENTION

In a method and apparatus for controlling a supercharged internal combustion engine including an exhaust gas turbocharger having variable turbine inlet vanes, an engine control unit includes an engine performance graph with control parameters for a multitude of engine operating points. A compressor performance graph is also recorded in the engine performance graph, which represents for various exhaust gas turbocharger speeds, a particular relationship between mass flow through the compressor and total pressure ratio. Furthermore, a multitude of engine operating curves for constant turbine guide vane positions and constant engine speeds for various engine loads and engine operating modes are recorded and retrieved by the engine control unit for controlling the engine depending on desired engine load and engine speed for adjusting the turbine inlet vanes.

It is a particular advantage of the method according to the invention that the information of the electronically stored compressor performance graph can be used for the calculation of additional values such as compressor speed, pumping limit distance, turbine inlet pressure and turbine inlet temperature. If needed, additional values may be utilized, which may be sensed or provided by an engine control unit such as fuel consumption. By storing a series of engine operating lines with a small interpolation width for each load state of the engine, high computing speeds and small action delays can be achieved. Particularly, momentary operating values of the exhaust gas turbocharger such as compressor speed, turbine inlet pressure and mass flow can be computed or taken out of the performance graph. This eliminates, for example, the need for speed sensors for the exhaust gas turbocharger or, respectively, the need for pressure sensors for the turbine inlet pressure.

The performance graph may further include electronically stored engine operating lines for a constant engine inlet pressure. Then a turbine inlet pressure can be taken from the performance graph for different exhaust gas turbocharger speeds, compressor mass flow and compressor pressure conditions. The data deposited in the performance graph can then be supplemented by lines of equal turbine inlet pressures (isolines). In this way, data for the turbine inlet pressures dependent on the various exhaust gas compressor mass flows and compressor pressure conditions can be directly taken from the performance graph.

It is particularly advantageous if the turbine is controlled to provide, depending on engine load and engine operating state, an optimum turbine guide vane position depending on engine load and engine operating state (engine driving or engine driven state, exhaust gas recirculation operation). In this way, the compressor is generally so adapted that under normal engine operation, the pumping and filling limits—including a height reserve—are avoided and the efficiency optimum of the compressor occurs in the main engine operating range. By changing the guide vane position of the exhaust gas turbocharger, it is then possible that the position of the operating line in the compressor performance graph can be influenced, that is, changed, for various engine operating states so that the compressor can be operated at the highest possible efficiency, for example, also during engine braking operation or during exhaust gas recirculation operation.

A cruise control during normal vehicle operation can be realized by maintaining the engine speed constant during engine load changes by changing the guide vane position of the exhaust gas turbine. When the engine load changes during uphill or downhill operation, the engine speed is maintained constant by appropriately adjusting the guide vanes position of the exhaust gas line. In this way, the engine speed may remain constant, for example, by reducing the guide vane flow cross-section during uphill driving and increasing the guide vane flow cross-section during downhill driving by appropriately adjusting the exhaust gas turbine guide vanes.

If during engine braking operation while the engine braking valve is operated, a guide vane position is taken from the performance graph by way of the predetermined compressor total pressure ratio corresponding to a desired braking power. It is possible with a desired exhaust gas recirculation to provide for the needed pressure difference between the exhaust gas side and the air intake side of the engine. The guide vane position for the exhaust gas turbine is then so controlled that the inlet pressure of the exhaust gas turbine is greater than the charge air pressure downstream of the charge air compressor or, respectively, downstream of an intercooler disposed downstream of the charge air compressor.

With this measure, the charge air compressor is operated somewhat outside its optimal operating area, but greatly simplifies exhaust gas recirculation.

During engine braking operation, while the engine braking valve is activated, a guide vane position corresponding to the desired engine braking performance can be derived from the performance graph by way of the predetermined compressor mass flow and the predetermined compressor total pressure ratio. This permits a control of the guide vanes during engine braking operation corresponding to the given initial condition and the desired engine braking power.

It is further advantageous that during engine braking operation, the engine braking power requirements are adjusted by an automatic control of the guide vane position of the exhaust gas turbine. While the engine speed is maintained constant, the braking level can be rapidly changed from a low to a high level. This can be done by closing the guide vanes of the exhaust gas turbine first up to a safety line which is stored in the performance graph and which is reached before the pumping limit for the compressor. Then the guide vanes are again opened by an amount corresponding to the higher brake power level. By first over controlling the guide vanes (closing of the guide vanes until the performance graph safety line is reached), the time required for achieving the new engine braking power is shortened as compared to an immediate setting of the guide vanes to the position corresponding to the required higher engine braking power.

During engine braking operation, the braking power can be changed by an appropriate automatic adjustment of the guide vane position of the exhaust gas turbine. In this way, a braking speed control arrangement can be advantageously realized.

If the position of selected operating lines of the performance graph can be adaptively corrected by the engine control unit age-related performance graph changes can be compensated for by an adaptation of the operating lines in the performance graph by the control system of the engine.

With the apparatus according to the invention, a reasonable basis for the control strategies for turbocharged internal combustion engines having exhaust gas turbochargers with variable turbine geometry can be provided. A control of the exhaust gas turbocharger is possible during engine braking operation, during engine power operation and during exhaust gas recirculation operation by way of a single performance graph in which all the necessary parameters and operating lines required for the various engine operating conditions are deposited.

BRIEF DESCRIPTION OF THE DRAWINGS

In the drawings, the invention is described on the basis of several performance graphs. The performance graph according to the invention, however, is preferably a single electronic performance graph in which all the shown performance graphs are combined and which is recorded in an electronic storage device, which is not shown.

DESCRIPTION OF A PREFERRED EMBODIMENT

For explaining the method according to the invention, first an apparatus for performing the method is described. It includes a turbocharged internal combustion engine whose exhaust gas turbocharger ATL includes an exhaust gas turbine TV with variable turbine geometry and a charge air compressor VD. The internal combustion engine has a performance graph KF which will be described below in greater detail and in which control parameters for a plurality of engine operating points M-BP for the operation of the engine are electronically stored which control parameters are used as input values for an engine controller for a desired value—actual value comparison.

Figure 1:
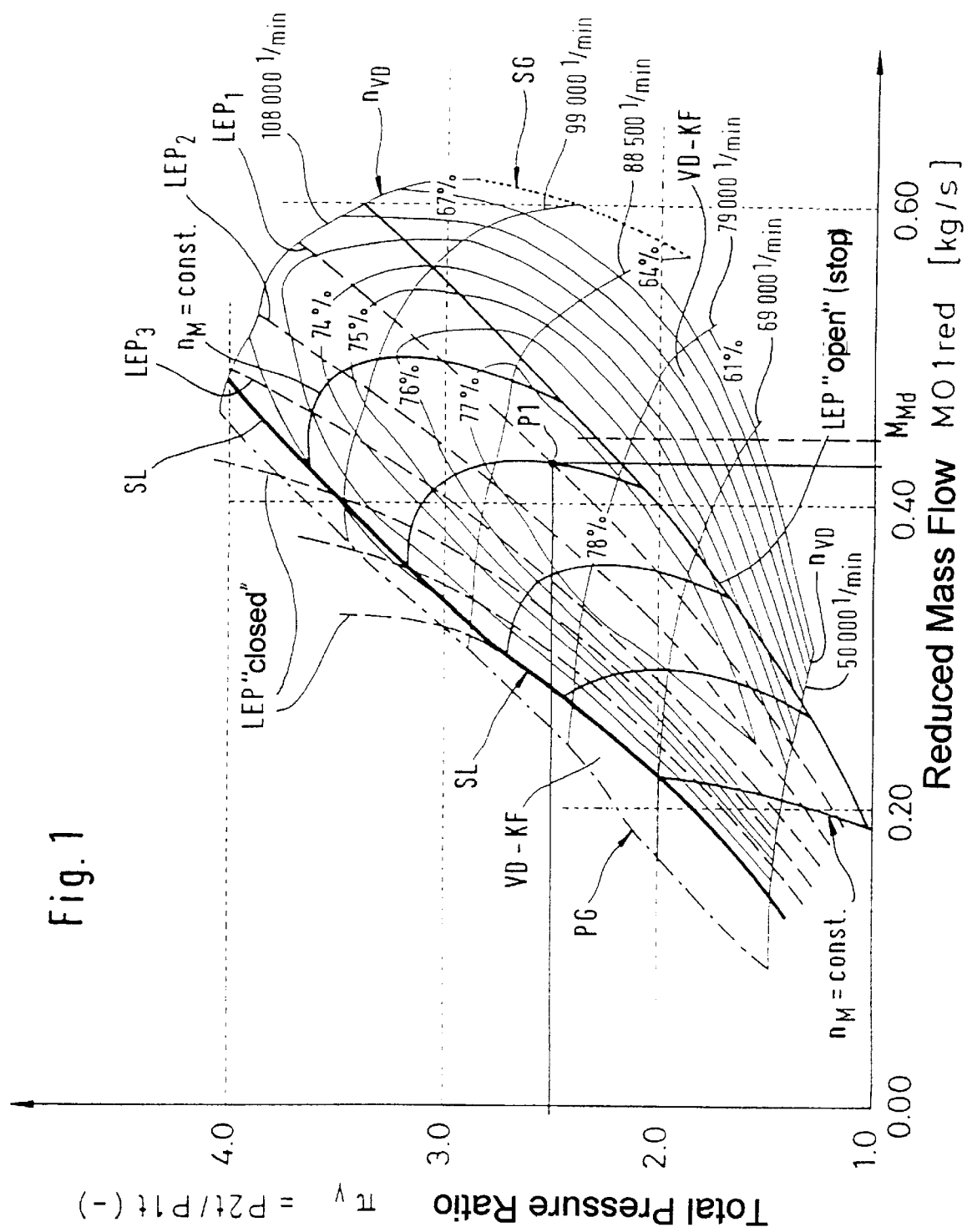
FIG. 1 shows a first performance graph, which comprises a compressor performance graph of the charge air compressor representing the relationship between mass flow and total pressure ratio. In addition, the performance graph includes a net of engine operating lines for constant guide vane positions of the exhaust gas turbine and constant engine speed for a particular engine operating state (for example, engine braking operation).

FIG. 1 shows a part of the performance graph according to the invention which comprises a compressor performance graph VD-KF of the charge air compressor VD and electronically coupled therewith a net of engine operating lines M-BL for constant guide vane positions LEP(LEP$_1$–LEP$_3$) of the exhaust gas turbine and constant engine speed n$_M$ (rpm) for a particular engine operating state (in this case, powerless operation of the internal combustion engine during engine braking operation) for various air mass flows M$_{Mot}$ of the engine.

Additional parts of the performance graph, which are not shown include, in a corresponding manner, the compressor performance graph VD-KF and a net of engine operating curves M-BL for constant guide vane positions of the exhaust gas turbine and constant engine speed for other engine operating states such as powered engine operation, exhaust gas recirculation operation and engine braking operation with a constant throttle position or with an on-off controlled engine braking valve.

On the base of the electronically stored performance graph part shown in FIG. 1, the reduced (normalized) mass flow values $M_{red}$ of the charge air compressor are presented with the following relationship:

$$M_{red} = M \times \frac{\sqrt{\frac{Tt_1}{Tb_{ez}}}}{\frac{pt_1}{pb_{ez}}} \quad [kg/s]$$

Wherein M=mass flow [kg/s]; Tt1, pt1=temperature and, respectively, pressure at the compressor entrance (for example, 981 mbar). On the ordinate, there is provided the total pressure ratio π=p2t/p1t (with p2t=compressor exit pressure and p1t=compressor entrance pressure).

The compressor performance graph VD-KF of the charge air compressor represents the relationship between mass flow $M_{red}$ and total pressure ratio π for various compressor speeds $n_{VD}$ (for example: values for $n_{VD}$ of 50,000/min to 108,000/min) and compressor efficiencies $n_{VD}$ (for example; values for $n_{VD}$ of 61% to 78%). The curves for the same efficiency values have a shell-like shape and the curves for the same compressor speeds $n_{VD}$ extend in the compressor performance graph VD-KF from the upper left to the lower right.

Since the exhaust gas turbine and the charge air compressor of the usual exhaust gas charger for internal combustion engine have a common shaft, the rotational speed of the compressor wheel is the same as that of the turbine wheel ($n_{VD}=n_{TU}=n_{ATL}$).

The compressor performance graph VD-KF is limited at the left by the pumping limit PG and at the right by the blocking limit SG of the compressor. At the pumping limit of the compressor, the flow separations in the outer blade areas of the wheel entrance become, at a given total pressure ratio, so extensive that a further reduction of the mass flow $M_{red}$ results in a total instability of the impeller wheel entrance flow. At the left of the pumping limit PG, there is therefore no stable pressure build up and, consequently also no stable operation of the compressor is possible. At the blocking limit SG, the speed of sound is usually reached in the narrowed effective flow cross-section, (usually the wheel blade entrance) of the compressor, whereby a further increase of the entrance volume flow, or respectively, the mass flow is physically prevented. This occurs at a predetermined total pressure ratio π. The compressor performance graph VD-KF is limited upwardly by the maximally admissible compressor speed $n_{VD}$, which is determined by the diameter—and material-dependent explosion speed of the compressor wheel.

Furthermore, the performance graph includes a net of engine operating curves M-Bl for constant guide vane positions LFP of the exhaust gas turbine and for constant engine speeds $n_M$ for various mass flows $M_{not}$ of the engine, which is electronically coupled with the compressor performance graph VD-KF. Consequently, for a given total pressure ratio π and a given mass flow $M_{red}$, there is a relationship of engine speed $n_M$ and guide vane position LEP in the performance graph. In this case, during engine power operation and during engine braking operation, the air mass flow $M_{Mot}$ corresponds to the mass flow $M_{red}$ through the charge air compressor.

The engine operating curves M-BL are generally generated by engine braking procedures (braking tests, computation), whereby the operating curves for powered engine operation and for engine braking operation are recorded. There may be different types of engine braking operations (for example, constant throttling, that is, the engine brake valve is constantly open, on-off engine braking valve operation or closed engine braking valve operation). However, in FIG. 1, only the engine operating curves M-BL for engine braking operation are depicted. As pointed out above for other types of engine operation, corresponding nets of engine operating curves M-BL are recorded in the performance graph and are electronically coupled with the compressor performance graph VD-KF.

From FIG. 1, it can be seen that, with closed or almost closed turbine guide vanes (LEP "closed"), theoretical operating curves are disposed in the performance graph to the left of the pumping limit PG. For this reason, the performance graph includes a so-called safety curve SL, which extends to the right of the pumping limit curve PG in the performance graph. When, during operation of the charge air compressor, the safety curve SL is reached, the turbine guide vanes are opened with increasing engine speed $n_M$. As a result, during engine operation, only operating points to the right of the safety curve SL of the compressor performance graph VD-KF are employed.

With the electronic coupling of the compressor performance graph VD-KF in accordance with the invention, using the net of engine operating lines M-BL for constant engine speed $n_M$ for various air mass flows $M_{Mot}$ at the same time for different engine operating modes, it is possible to take from the performance graph engine load and/or engine speed $n_M$—dependent preferred guide vane positions for the exhaust gas turbine. These guide vane positions are, for example, engine efficiency optimized for any of the engine operating modes (engine power operation, engine braking operation, exhaust gas recirculation operation) and the guide vanes can be accordingly adjusted.

Below a particular embodiment of the method according to the invention for engine braking operation will be described in greater detail. The control input values supplied to the engine control unit are, in addition to the braking power requirement (for example, brake pedal or engine brake button actuation), the measured total pressure ratio π of the compressor and the mass or volume flow of the engine $M_{Mot}$ or respectively, the charge air compressor $M_{red}$. An engine operating point M-BP can accordingly be determined in the performance graph by way of the normalized turbocharger$_{ez}$ and Pb$_{ez}$. This engine operating point M-BP is designated in FIG. 1 by P1. As pointed out earlier, the net of operating curves for constant guide vane positions and constant engine speed determined by the above engine tests is electronically coupled with the performance graph. As a result, the output value "turbine guide vane position LEP" with which the desired braking power is coupled can be derived directly from the measured input values "mass flow $M_{red}$" and "total pressure ratio π". In the performance graph of FIG. 1, the guide vane position LEP, is directly coordinated with the engine operating point P1 and accordingly can be retrieved from the performance graph.

Depending on the engine operating mode (constant throttle, on/off engine brake valve, engine driven operation), a guide vane position LEP as defined for a particular engine operating mode and for the rest of the operating parameters is automatically selected. For safety surveillance, the compressor speed $n_{VD}$ is available to the control system by way of the compressor performance graph VD-KF.

Figure 2:
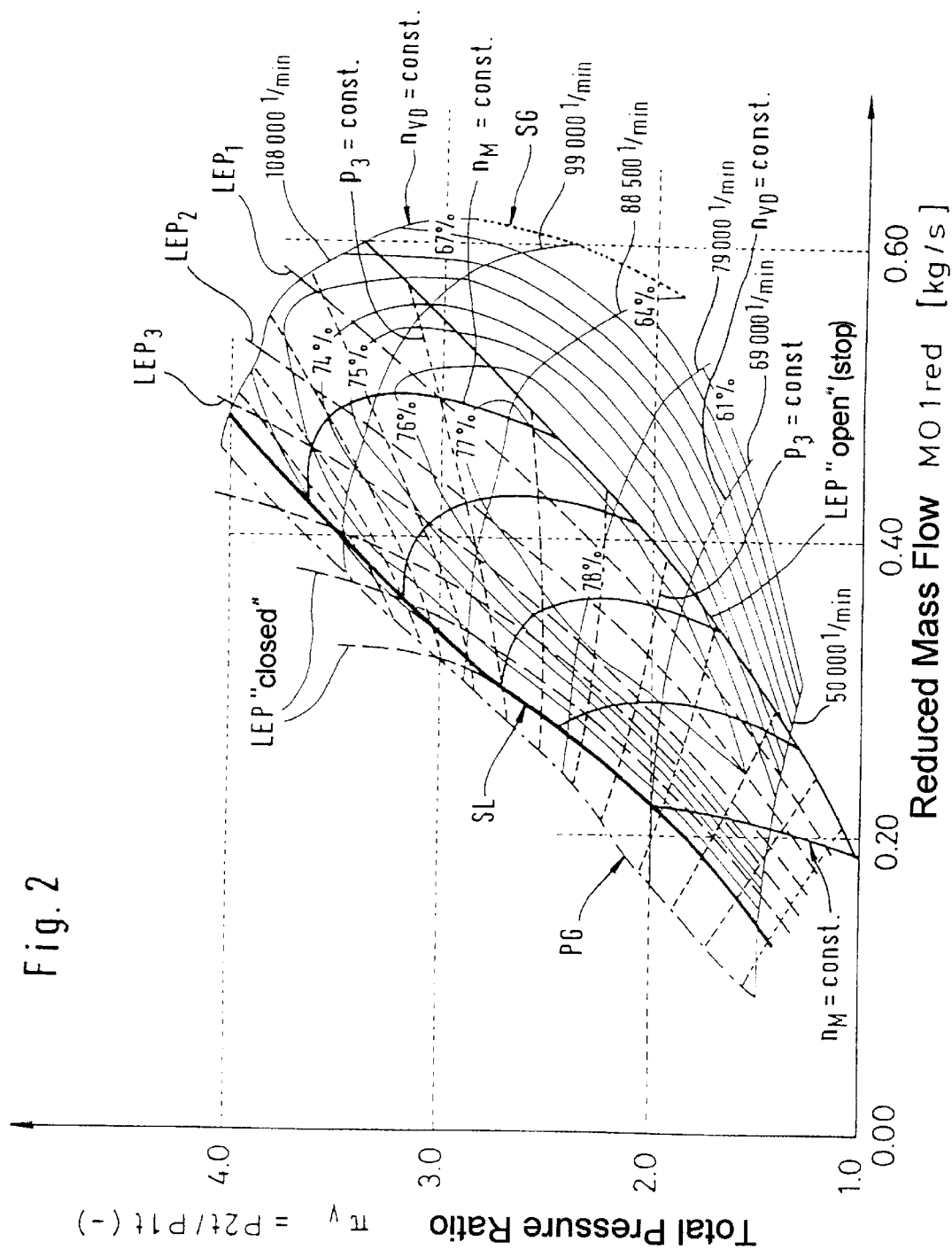
FIG. 2 shows another performance graph corresponding to that shown in FIG. 1, which however, additionally includes stored therein engine operating curves for a constant turbine inlet pressure.

FIG. 2 shows another performance graph corresponding to that shown in FIG. 1. The operating curves and parameters, which are the same as shown in FIG. 1, are designated by the same reference signs. In addition, the performance graph of FIG. 2 includes electronically stored engine operating lines M-BL for a constant turbine inlet pressure $p_3$ ($p_3$=const.). Accordingly, a respective turbine inlet pressure $p_3$ of the exhaust gas turbine for different compressor speeds $n_{VD}$ (or respectively, exhaust gas turbocharger speeds $n_{ATL}$), compressor mass flows $M_{red}$ and compressor total pressure ratios can be retrieved from the performance graph.

Figure 3:
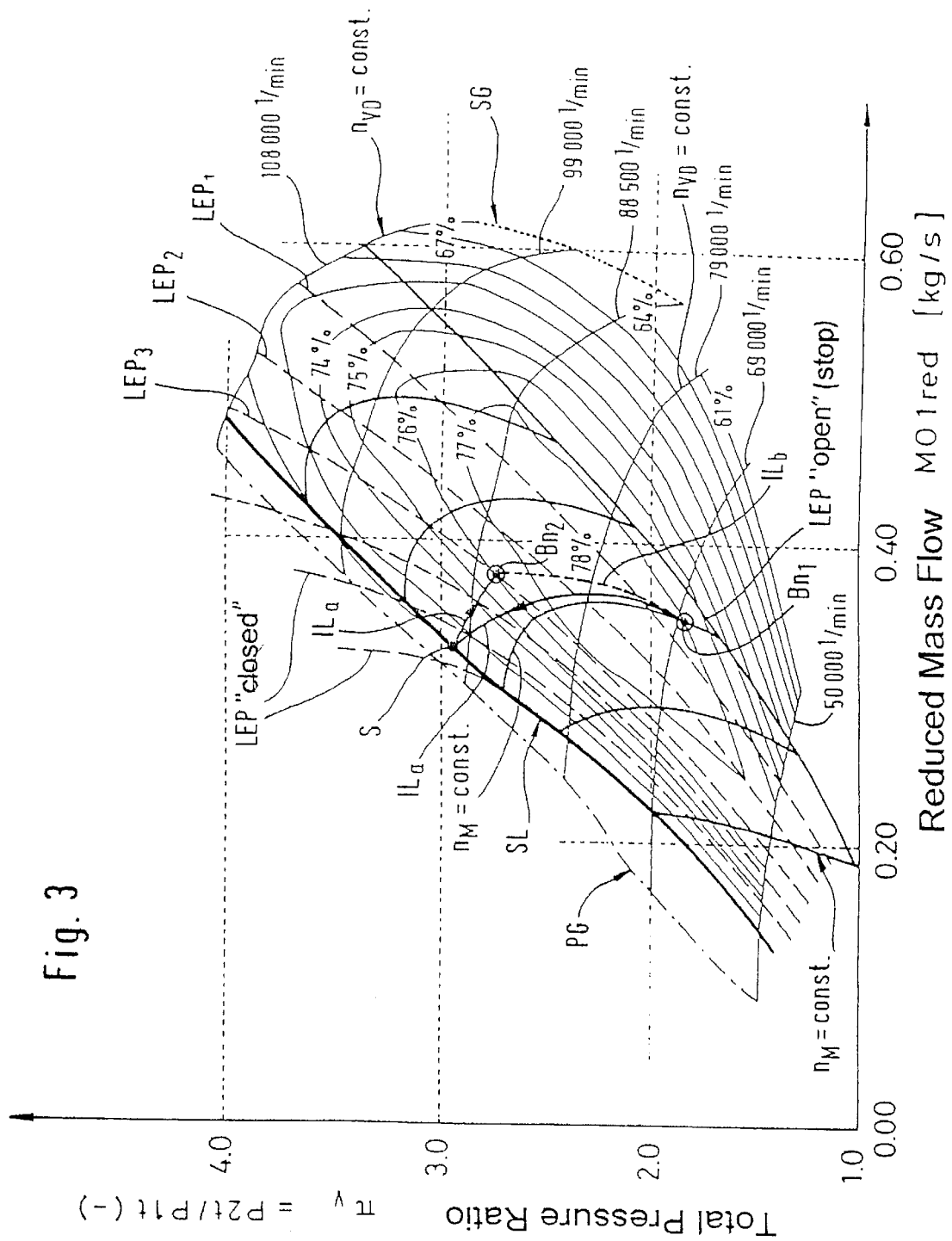
FIG. 3 shows the performance graph of FIG. 1 for an engine braking state, wherein an in stationary phase, as it exists during transition from a low engine braking level to a higher engine braking level, is initiated by a control of the guide vanes. The control is executed in such a way that the guide vanes of the exhaust gas turbine are first closed up to a safety line which is stored in the performance graph and the guide vanes are disposed ahead of the pumping limit of the compressor and is then again opened by an amount corresponding to the higher braking power level.

In the performance graph of FIG. 3, the operating curves and parameters, which are the same as those shown in FIG. 1, are designated by the same reference signs. FIG. 3 shows an engine braking control change from a low engine braking level $Bn_1$ to a higher engine braking level $Bn_2$. In order to reach the higher engine braking level $Bn_2$ as fast as possible, starting out from the engine braking level $Bn_1$, the turbine guide vanes LE are first closed for a period of time until, in the compressor performance graph VD-KF, the safety curve SL (point S in FIG. 3) is reached. Then the turbine guide vanes LE are opened to the degree corresponding to the increased braking level $Bn_2$. With this pre-designed over-control toward the safety curve SL, the desired braking level $Bn_2$ is achieved relatively quickly. The in stationary line IIa initiated by the control of the turbine guide vane LE during engine braking operation accordingly does not extend directly from $Bn_1$ to $Bn_2$ as it would in accordance with the dashed line IIb, since along the line IIb, it would take longer to reach the operating point $Bn_2$.

In a particular embodiment of the method, a braking speed control can be established during engine braking operation, wherein the engine braking requirement is controlled by an automatic adjustment of the guide vane position LEP of the exhaust gas turbine in such a way that the engine speed $n_M$ remains constant.

Furthermore, the engine speed $n_M$ can be maintained constant while the engine load is changing, for example, when the engine load is increased during uphill driving or the engine load is reduced during downhill driving by appropriately controlling the guide vane position LEP of the exhaust gas turbine.

Figure 4:
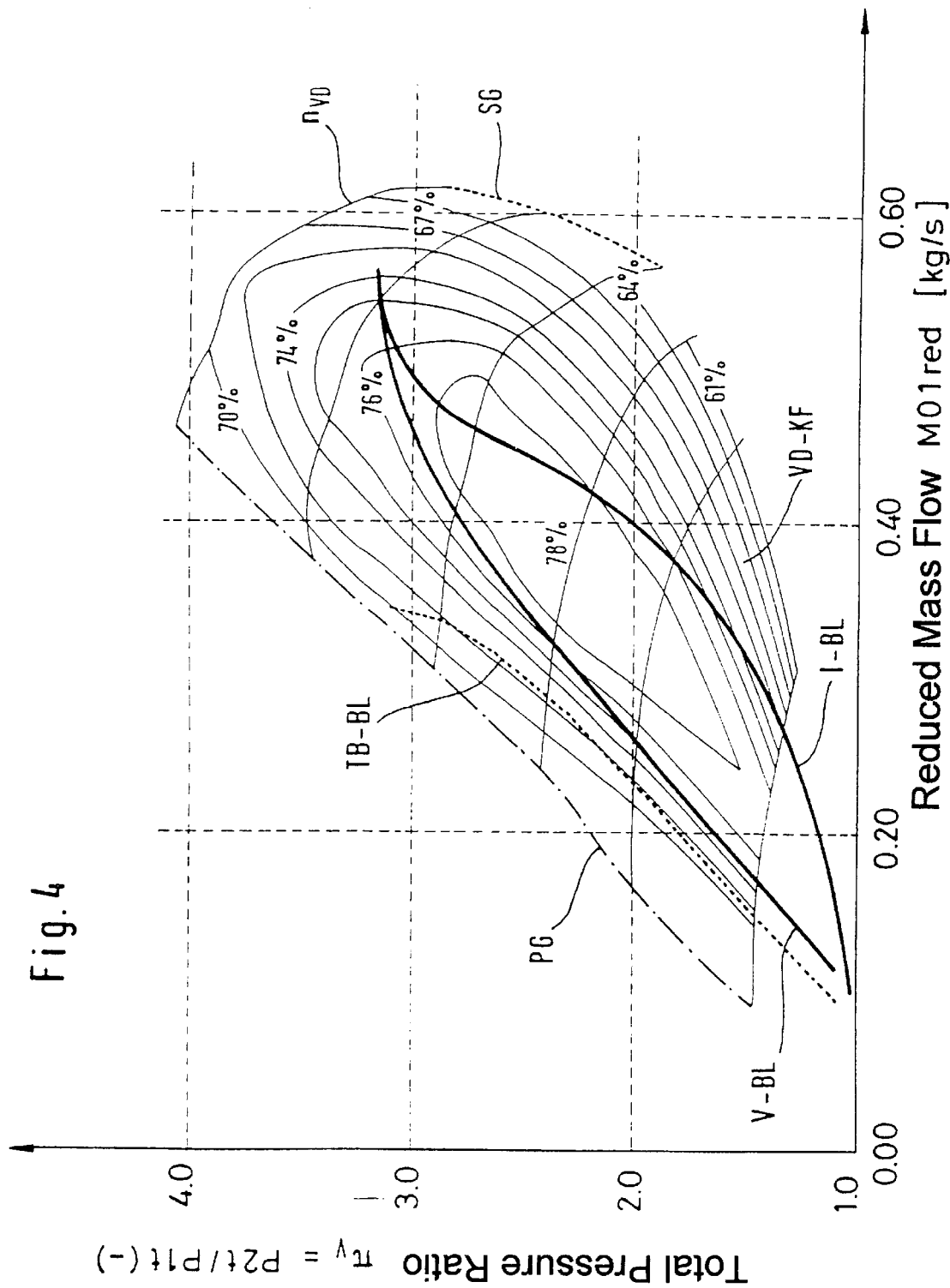
FIG. 4 shows another performance graph in which, in addition to the compressor performance graph characteristic, engine operating curves (full load operating curve, in stationary operating curve, turbo braking operating curve) for a single guide vane position are given.

FIG. 4 shows another performance graph in which, in addition to the compressor performance graph characteristic engine operating curves M-BL are recorded. For clarity reasons, however, they are shown only for a guide vane position LEP of the exhaust gas turbine TV. The same operating curves and parameters shown already in FIG. 1 are indicated by the same reference signs. The engine operating curves M-BL additionally stored in the compressor performance graph VD-KF are a full load operating curve V-BL, an in stationary operating curve I-BL and an operating curve for turbo-braking operation TB-BL. It can be seen that the engine operating curves M-BL are disposed in the operating range of the charge air compressor for optimal efficiency. The location and shape of the engine operating curves M-BL in the compressor performance graph VD-KF can be influenced by a selection of the design features of the turbine. If a relatively small exhaust gas turbine is selected, the full load operating curve of the engine is closer to the pumping limit PG and [that], consequently, a higher air number or a higher engine torque can be obtained at lower engine speeds. The instationary curve is mainly determined by the polar mass moment of the movable part of the exhaust gas charger (shaft and wheels).

Figure 5:
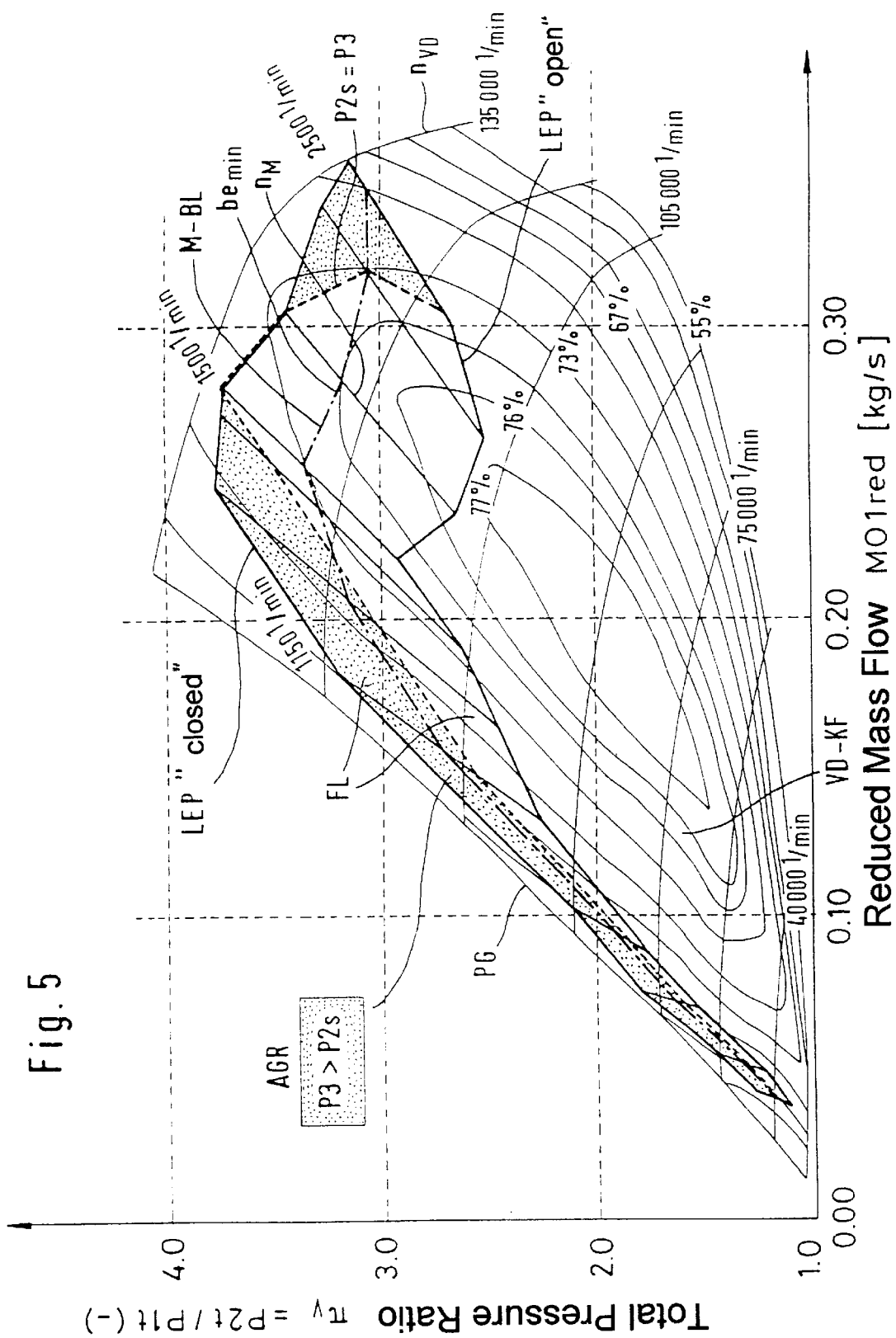
FIG. 5 shows another performance graph in which, in addition to the compressor performance graph, a characteristic operating curve for most efficient engine operation in the area of possible exhaust gas recirculation under full load of the engine for various guide vane positions of the exhaust gas turbine are stored.
Figure 6:
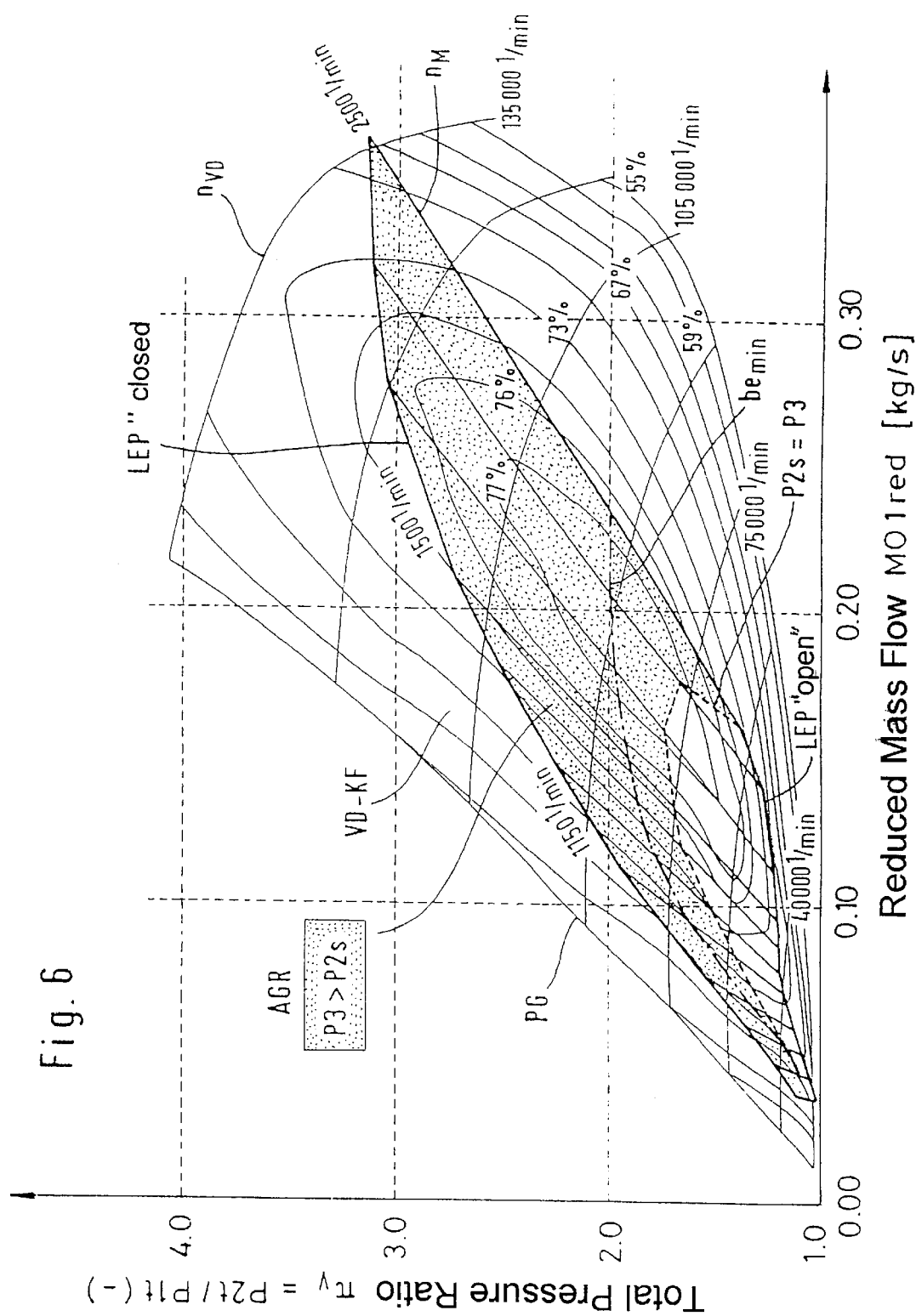
FIG. 6 shows another performance graph corresponding to that of FIG. 5 for partial engine load operation.

FIGS. 5 and 6 each show another performance graph in which, in addition to the compressor performance graph, characteristic engine operating curves M-BL for consumption-optimized engine operation (consumption optimized operating curve $be_{min}$) and a range of possible exhaust gas recirculation under full engine load (FIG. 5) or, respectively, for 50%—partial engine load (FIG. 6) are represented for various guide vane positions of the exhaust gas turbine (LEP "closed" to LEP "open").

During operation of the exhaust gas turbine with variable turbine geometry, that is, with variable guide vanes and, consequently, different possible guide vane positions LEP, there is not only a single full load operating curve in the compressor performance graph (see FIG. 4) as it is the case with immovable guide vanes, but there is for each vane position a different full load engine operating curve in the compressor performance graph VD-KF. Then, in the compressor performance graphs VD-KF, an area FL is covered for a corresponding load curve (FIG. 5: full load curve), which area FL includes the parameters engine speed and guide vane position LEP). Consequently, with exhaust gas turbochargers with variable turbine geometry, an engine operating point M-BP can be maintained with different air numbers (volume flow or, respectively, mass flow $M_{red}$ pressure ratio) and exhaust gas turbocharger efficiencies $n_{ATL}$.

Such a degree of freedom obtained by the variable turbine guide vane geometry is apparent from FIG. 5 for the full load curve (area FL). Into the usable wide operating area as shown in the compressor performance graph VD-KF as it is obtained by the adjustable guide vanes, preferably the following characteristic engine operating curves M-BL, which are relevant for the control of the charged engine are recorded:

limit lines for guide vane positions LEP (=guide vanes fully opened and guide vanes fully closed), guide vane position LEP for a consumption—optimized engine operating line $be_{min}$, guide vane position LEP for an engine operating line M-BL which marks a limit for the exhaust gas recirculation range AR. For this operating line, the pressure at the exhaust gas recirculation point in the charge air duct (for example, downstream of a charge air cooler) equals the turbine inlet pressure $p_3$ of the exhaust gas turbine TV ($p_{2s}$=$p_3$), and an in stationary line for acceleration of the engine (see FIG. 4).

The limit curve "guide vanes opened" (guide vanes in an open position) indicates that either the upper mechanical stop of the variable guide vanes has been reached or the air ratio, that is, the smoke formation limit and the exhaust gas temperature for the desired engine torque prevent in principle further opening of the guide vane flow cross-section. If, with respect to the full load curve, and with respect to resiliency behavior, a relatively large turbine is used then only a small angular range between a closed vane position and a fully open vane position signal is available since otherwise, the smoke formation limit would be exceeded, that is, there would be no complete combustion of the fuel/air mixture in the cylinder. The large opening reserves of the movable vanes can be utilized only in the partial load range (see FIG. 6). If the variable vane exhaust gas turbine [has a] is relatively small, there will be relatively large air ratios during operation at the upper mechanical stop (vane position "open"), which has disadvantages for a good gas exchange. The control range is therefore relatively narrow.

The limit line "vanes closed" means, depending on the resiliency of the turbine, an operation of the turbine:

at the lower mechanical stop for the guide vanes where the turbine vanes are in a minimal opening position for the flow vanes at the vane exit, with a vane position, wherein the pumping limit PG of the compressor (or, respectively, the safety line SL disposed in front of the pumping limit PG) is just not exceeded, a maximally admissible cylinder pressure or, a maximally admissible exhaust gas back pressure (turbine inlet pressure $p_3$).

Within the usable area FL of the compressor performance graph VD-KF which is determined by the vane limit positions (LEP "open", LEP "closed", the consumption optimized operating curve $be_{min}$ of the engine can be stored in the performance graph.

The optimized consumption curve $be_{min}$, extends in dependence on the parameter guide vane position LEP, in a full load state qualitatively normally always closer to the closed than to the open guide vane position LEP provided there is a suitable charger tuning for the respective engine. In the lower engine speed range, the increased air supply provides for efficiency losses of the exhaust gas turbocharger, whereas in the upper engine speed range, efficiency is supported by a high resiliency of the turbine whereby the gas exchange is positively influenced. With a load reduction, the consumption-optimized vane position $be_{min}$ is more and more remote from the closed vane position (see FIG. 5, right top). This is particularly true for low loads at high engine speeds.

It is also possible to determine within the usable area FL of the compressor performance graph VD-KF a partial area within which the exhaust gas recirculation AGR from the exhaust gas side to the air inlet side of the internal combustion engine can occur.

The average pressure difference $pe_m$ between the turbine inlet pressure $p_3$ and the pressure downstream of the charge air compressor $p_2$, or respectively, downstream of the charge air cooler $p_{2s}$ can be used as a reference point to determine whether exhaust gas can be supplied to the air intake duct downstream of the compressor. In this respect, the following has to be taken into consideration: the better the overall efficiency of the exhaust gas turbocharger $N_{ATL}$ at the respective engine operating point, the more difficult or even impossible, it is to recirculate exhaust gas without additional aids (for example, ejectors).

However, an exhaust gas turbocharger including a turbine with variable turbine geometry offers the possibility of a controlled reduction of the overall efficiency of the exhaust gas turbocharger $n_{ATL}$ by way of a suitable reduction of the guide vane flow cross-section in exchange for generating the negative pressure drop $p_2$–$p_3$ needed for exhaust gas recirculation in a wide engine operating range provided the cylinder pressure limit and the exhaust gas turbocharger speed limit are not exceeded. In FIG. 5, the partial area which is shown in the compressor performance graph VD-KF by a pointed line permits exhaust gas recirculation AGR. As can be seen from FIG. 6, an operation with substantially greater exhaust gas recirculation area is possible. As a result, during engine operation with exhaust gas recirculation, the guide vane position LEP can be so controlled that a turbine inlet pressure $p_3$ greater than a pressure $p_{2s}$ downstream of the compressor or downstream of the charge air cooler can be obtained at the air intake side of the engine in exchange for a small efficiency loss of the exhaust gas turbocharger.

In a further embodiment of the invention, the position of selected operating curves in the performance graph can be corrected by the control system of the engine adaptively such that after extended operating periods of the exhaust gas turbocharger a possible wear or blade deposits can be compensated for.

In addition in another embodiment of the invention, the method can be modified such that the internal combustion engine can be controlled by way of electronically recorded turbine performance graphs of the exhaust gas turbine.

What is claimed is:

1. A method of controlling a supercharged internal combustion engine including an exhaust gas turbocharger having an exhaust gas turbine with variable turbine inlet vanes and a charge air compressor, said internal combustion engine having an engine performance graph including control parameters' for the operation of the engine corresponding to a multitude of engine operating points, and an engine control unit to which said control parameters are supplied as input values for generating engine control signals on the basis of a comparison of the input values with actual engine operating values, said method comprising the steps of:

Providing, in said engine performance graph, an electronically recorded compressor performance graph area of the charge air compressor which represents a particular relationship between mass flow through the compressor and total pressure ratio for various exhaust gas turbocharger speeds, providing in said engine performance graph furthermore a multitude of engine operating curves for constant guide vane positions of the exhaust gas turbine and constant engine speed for various engine loads and various engine operating modes (engine power operation, engine braking operation, exhaust gas recirculation operation), retrieving from the performance graph a preferred guide vane position for the exhaust gas turbine inlet vanes for a particular engine operating mode depending on engine load and engine speed, and accordingly adjusting the position of the exhaust gas turbine inlet vanes.

2. A method according to claim 1, wherein additionally electronically recorded engine operating lines for constant turbine inlet pressures are provided in the engine performance graph and retrieving from the engine performance graph for various exhaust gas turbocharger speeds compressor mass flow values and compressor pressure ratios, a respective turbine inlet pressure.

3. A method according to claim 1, wherein, depending on engine load and engine operating mode, the guide vanes of said exhaust gas turbine are adjusted to a position providing for an optimal compressor efficiency.

4. A method according to claim 1, wherein, during a change of the engine load (load increase or load reduction), the exhaust gas turbine guide vanes are so controlled that, the engine speed is maintained constant.

5. A method according to claim 1, wherein, during operation of the engine in an exhaust gas recirculation mode, the guide vanes are adjusted to such a position that a turbine inlet pressure is maintained which is greater than a pressure downstream of the compressor or a compressed air cooler at the charge air inlet side of the engine.

6. A method according to claim 1, wherein, during operation of the engine in an engine braking mode while an engine braking valve is actuated, a guide vane position is retrieved from the engine performance graph by way of the given compressor mass flow and the given compressor total pressure ratio corresponding to the desired engine braking power.

7. A method according to claim 6, wherein, during transition from a low braking power level to a higher braking power level, the guide vanes of the exhaust gas turbine are first closed to a safety line, which is recorded in the performance graph and which is lower than a pumping limit of the compressor and the guide vanes are subsequently again opened to a position corresponding to the desired higher braking power level.

8. A method according to claim 6, wherein the braking power output of the engine is adjusted by automatically controlling the guide vane position of the exhaust gas turbine in such a way that the engine speed remains constant.

9. A method according to claim 1, wherein selected operating curves in the performance graph are corrected by the engine control unit so as to adapt them to changed conditions.

10. A method according to claim 1, wherein turbine performance graph areas are additionally recorded in the engine performance graph.

11. An apparatus for controlling a supercharged internal combustion engine including an exhaust gas turbocharger having an exhaust gas turbine with variable turbine inlet vanes and a charge air compressor, said internal combustion engine having a performance graph including, electronically stored therein, control parameters for a multitude of engine operating points, and an engine control unit to which the control parameters are supplied as input values providing a basis of comparison with actual engine operating values, said engine performance graph including an electronically recorded compressor performance graph which represents the relationship between compressor mass flow and total pressure ratio for various exhaust gas turbocharger speeds and said engine performance graph further including a multitude of engine operating lines for constant guide vane positions of the exhaust gas turbine and constant engine speeds for various engine loads and engine operating modes (engine power operation, engine braking operation, engine exhaust gas recirculation mode).

12. An apparatus according to claim 11, wherein said engine performance graph additionally includes electronically stored engine operating lines for a constant turbine inlet pressure.

* * * * *